Oct. 26, 1965   J. E. DWYER   3,213,746
ANCHORING SOCKET FOR SCREW TYPE FASTENERS
Filed Oct. 24, 1963
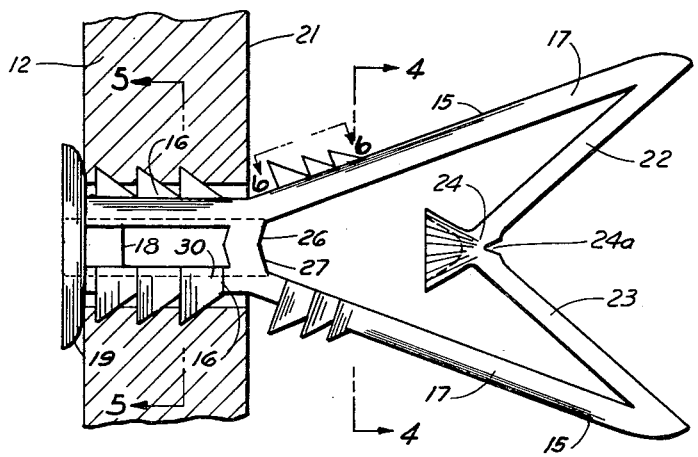
FIG. 1
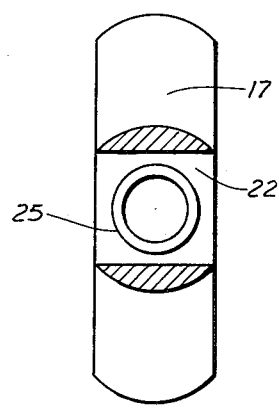
FIG. 4
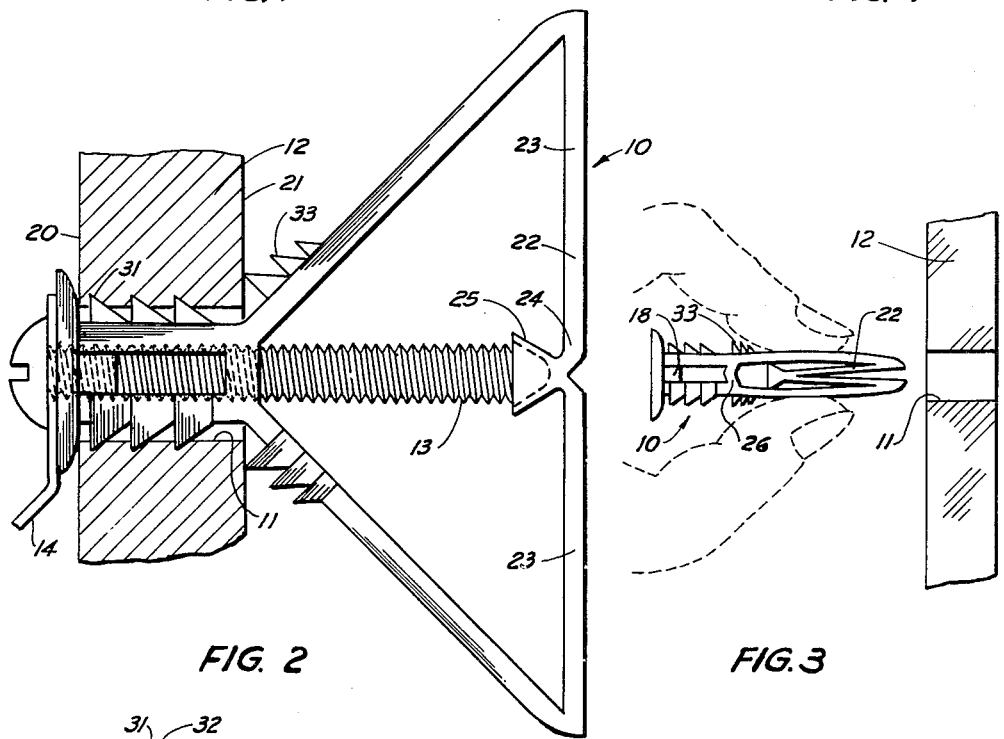
FIG. 2   FIG. 3
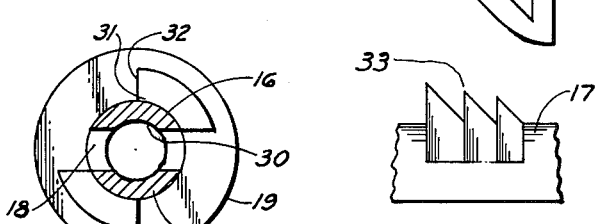
FIG. 5   FIG. 6
INVENTOR
JAMES E. DWYER
ATTORNEY United States Patent Office 3,213,746
Patented Oct. 26, 1965

3,213,746
ANCHORING SOCKET FOR SCREW TYPE
FASTENERS
James E. Dwyer, San Jose, Costa Rica
(2541 Folsom, Apt. 8, San Francisco, Calif.)
Filed Oct. 24, 1963, Ser. No. 318,534
11 Claims. (Cl. 85—80)

This invention relates to an improved socket device for anchoring or securing bolts or screws and the like in walls.

Plaster, gypsum board, thin wood, and other wall materials are usually not strong enough to retain standard screws for supporting fixtures or brackets such as those used for drapery traverse rods or lighting fixtures and the like. Thus, with such wall material an additional anchoring socket of some form is required in order to secure a bolt or screw to the wall and thereby form a strong and reliable fixture installation. Preferably, the socket should grip the inside of the wall so that it cannot be pulled out and will not twist after the screw or bolt has been inserted and taken up to secure the fixture.

A general object of my invention is to provide an improved anchoring socket, one that can be quickly and easily installed in a wall aperture and which when installed will be anchored in the wall firmly so that the screw or bolt secured by it will support sustained loads without pulling out.

Another object of the present invention is to provide an anchoring socket for securing a screw in a wall aperture that will not twist within the aperture when the screw is tightened within the socket.

Yet another object of my invention is to provide an anchoring device for screws and the like having a relatively simple but unique one-piece construction and which can be inexpensively manufactured from a strong, durable, but resilient plastic material.

A more specific object of the present invention is to provide a socket device for enchoring a screw in a relatively thin wall board material and having flexible portions which can be pressed together to facilitate the insertion of the socket in a pre-drilled aperture through the wall material, the flexible portions being adapted to spread apart to a greater diameter near the inner surface of the wall as the screw is installed so that the body section of the socket device forms a wedge shape within the aperture that prevents it from being pulled out.

Another object of the present invention is to provide an anchoring socket for securing a screw in a wall aperture that has flexible end portions connected by a foldable web portion which is retractable inwardly to a compressed compact position between the flexible portions when the socket is initially inserted into the wall aperture, but which is adapted to straighten out and thereby to spread apart the flexible end portions of the socket and press them against the inside wall around the aperture when a screw within the socket is threaded axially therein.

A further object of the present invention is to provide an anchoring socket for securing a screw in a thin wall and having a flexible web member with a wishbone-like shape which will guide the end of the screw to the joint of the web member and prevent the screw from becoming disengaged therefrom as it is advanced, thus causing the web member to spread apart portions of the socket and secure it firmly within a wall aperture.

Other objects, advantages and features of the invention will become apparent from the following detailed description and from the drawings, in which:

FIG. 1 is an enlarged view in side elevation of a screw or bolt anchoring socket embodying the principles of the invention;

FIG. 2 is a somewhat smaller view in elevation showing the anchoring socket of FIG. 1 fully inserted into the wall aperture with a screw inserted within the socket;

FIG. 3 is a view in elevation showing the anchor socket of FIGS. 1 and 2 as it is being initially inserted into a wall aperture;

FIG. 4 is a view in section taken along line 4—4 of FIG. 1;

FIG. 5 is an enlarged view in section taken along the line 5—5 of FIG. 1;

FIG. 6 is a fragmentary top view taken along line 6—6 of FIG. 1.

In the drawings, FIG. 1 shows an anchoring socket 10 embodying the principles of the invention as it appears after having been initially inserted into an aperture 11 of the wall 12, but before a screw has been driven within the socket. FIG. 2 shows the socket 10 in place firmly anchoring a screw 13 that is supporting a bracket 14 or any such device that must be attached to a wall such as a fixture for hanging draperies or curtains.

In general, the anchoring socket comprises a pair of elongated but angular shaped body members 15 that are similar in shape and connected together by a series of web members. Each of the body members 15 has a shallow V-shape comprised of a pair of integrally connected segments 16 and 17 that are relatively inclined to each other at an obtuse angle. The segments 16 of the body members 15 are spaced apart and substantially parallel before the screw 13 is inserted, as shown in FIG. 1. At their head end the segments 16 are connected by a fixed annular web member 18 and extending outwardly therefrom is a radial flange 19. When the socket 10 is in place within the wall aperture 11 with its flange 19 engaging the outer wall surface 20, the front or first segments 16 form a split plug-like or generally tubular front body portion with axially extending slots on opposite sides and having substantially the same length as the wall thickness. The second body segments 17 that are integral with the segments 16 are essentially leg members that diverge from each other as they extend away from the tubular body portion and beyond the inside surface 21 of the wall 12.

Connected to the ends of the divergent segments 17 is a flexible or foldable web member 22 which, in accordance with the invention, helps in anchoring the socket 10 within the wall aperture 11. The web member 22 is comprised of a pair of links 23 connected together in a V-shape at a joint 24 which is flexible due to the nature of the semi-rigid resilient material from which the socket 10 is constructed. The joint 24 lies on the axial centerline of the socket 10 and, as shown in FIG. 2, its front end is provided with an integral cone shaped portion 25 forming a recess for receiving the end of the screw 13 that is driven within the socket 10. The rear side of the joint 24 has a V-shaped notch 24a to permit the web member 22 to flex easily.

At or near the junctions of the segments 16 and 17 the body members 15 are connected by another slightly flexible web member 26. This latter web member, which is smaller than the web member 22, enables the main body segments 16 to be spread further apart at one end near the inner surface 21 of the wall 12 as the screw 13 is driven between the body members 15. As shown in FIGS. 1 and 2, the web member 26 is also V-shaped in cross section and is provided with a central opening 27 through which the screw 13 is threaded as the socket is installed.

In accordance with the principles of my invention, all of the aforementioned components of the socket 10 are preferably formed together as a one-piece unit from some suitable plastic material by using well known molding techniques. Several different plastic materials may be used, but I prefer to use a solid nylon material since it has unusual qualities of strength and resiliency.

The spaced apart segments 16 forming the plug-like portion of the socket device 10 are curved in cross section, as shown in FIG. 5, and each has a longitudinal groove or recess on its inside surface. Together these recesses form an axial bore 30 in the plug or tubular front portion of the socket which has a diameter somewhat smaller than the outer thread diameter of the screw 13. Thus when the socket 10 is in the wall aperture 11 and the screw 13 is inserted through the fixed web 18, the screw will cut its own threads in the plug portion as it is turned. The bore may also be tapered inwardly somewhat from the head end of the socket so that as the screw is advanced, the web 26 will straighten and the segments 16 will tend to spread apart and form a wedge shape within the wall aperture. On its outer surface each plug segment 16 is provided with a plurality of serrated portions 31 or teeth which are longitudinally spaced apart therealong. These teeth 31 preferably are sharp edged and are sloped outwardly and rearwardly toward the front end of the socket. As shown in FIG. 5, the teeth 31 on each segment 16 are arranged in axial alignment and they do not extend entirely across the outer surface of each segment 16, but rather only across a portion thereof. Thus, each row of teeth has a radially and axially extending flat face 32 along each segment 16. When the socket 10 is inserted, the teeth 31 interfere somewhat with the wall around the aperture and the flat face 32 tends to dig into the wall and cause increased interference to prevent the socket from turning within the aperture as the screw is tightened.

A similar series of radially extending serrated portions 33 are also provided along a portion of each outer segment 17 near its junction within a main body segment 16 to further help the socket 10 grip the inner surface 21 of the wall 12 as the screw 13 is tightened within the socket 10.

In installing a bracket or fixture with an anchoring socket 10, in accordance with the invention, the wall is first drilled to form the aperture 11 to a diameter that is somewhat less than the outer diameter of the teeth 31 but large enough to receive the plug body segments 16. To initially insert the socket 10, as shown in FIG. 3, the spread apart segments 17 of the socket device are merely compressed between a person's fingers and the socket is forced into the aperture. During this insertion the large web member 22 is folded rather tightly between the body segments 17. However, when the socket is fully inserted within the wall aperture the segments 17 are free to spread apart on the inside of the wall to their normally molded position, as shown in FIG. 1. Now, as shown in FIG. 2, the screw 13 is inserted through the opening of the fixed annular web 18 at the head of the socket and is advanced between the body members 15. As the screw is threaded through the bore 30 formed between the plug segments 16, the latter tend to spread apart and the web member 26 commences to straighten out. As this spreading apart of the body segments 16 occurs, the exterior teeth 31 penetrate the wall material surrounding the aperture 11 and together with the flat faces 32 they prevent the socket 10 from twisting therein. Since the segments 16 are connected together by the fixed web member 18 at their outer ends they become wedge shaped within the wall aperture, and as the screw 13 is advanced further, the socket 10 becomes more firmly anchored.

When the end of the screw 13 passes through the small web member 26 it engages the cone shaped portion 25 at the joint 24 of the large web member 22 and forces the web links 23 to flex about the joint 24 and to straighten out. In doing so the segments 17 are bent back and spread further apart. This also causes a further spreading of the forward body segments 16 and thus a further tightening of the socket 10 within the wall aperture. In the fully extended position the large web member 22 is straightened out completely and the segments 17 hold the segments 16 in a spread apart wedge-like shape and are themselves pressed tightly against the inside surface 21 of the wall. Thus, the socket is secured firmly within the wall and the screw is threaded tightly within the socket, making a strong durable mounting support.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A socket device for anchoring a screw to a wall comprising:

a pair of angular shaped body members, each said body member having a first longitudinal segment and a second segment integrally attached and inclined thereto;

a fixed non-yieldable web member having an axial opening and connecting said first longitudinal segments together at one end, thereby forming the head end of the socket, and a flange extending radially outwardly from said longitudinal segments at said head end, said first segments being substantially parallel within a wall aperture before a screw is inserted within the socket, while said second segments are divergent relative to each other;

a first slightly flexible web means connecting said body members at the junctions of said first and second segments and having a central opening;

a second flexible web means located between and connecting the ends of said second integral segments, for forcing said second segments further apart to secure the socket device within a wall aperture when it is engaged by a screw advanced axially between said first segments and through said fixed and said first flexible web members.

2. A socket device for anchoring a screw in a wall aperture formed as a unitary structure from a molded plastic material and comprising:

a pair of angular shaped body members each having a first longitudinal segment and a second segment integrally attached and inclined thereto, said first segments being substantially parallel while said second segments are divergently positioned relative to each other;

a fixed non-yieldable web member having an axial opening and connecting said first longitudinal segments together at one end, thereby forming the head end of the socket, and a flange extending radially outwardly from said longitudinal segments at said head end;

a first flexible web means connecting said body members at the junctions of said first and second segments and having a central opening aligned with the opening of said fixed web member;

a second flexible web means located between and connecting the ends of said second integral segments, said second flexible web means having a V-shape with the apex of the V forming a flexible joint axially aligned with the opening of said fixed web and said first flexible web means;

and means on said joint for receiving and retaining the end of a screw advanced axially between said first longitudinal segments;

whereby said second flexible web means is progressively straightened as the screw is advanced into the socket, thereby causing the first and second segments of said body members to spread apart and secure the socket in the wall aperture.

3. A socket device for anchoring a screw to a wall comprising:

a generally tubular front body portion having circumferentially continuous portions at both ends;

a radially extending flange at one end of said front body portion forming the head end of said device;

a pair of normally divergent leg members extending from the other end of said front body portion;

a V-shaped flexible web member connected at its ends to the terminal ends of said divergent leg members with the vertex of said web member located substantially in line with the axial centerline of said front body portion, said flexible web member being foldable between said divergent leg members when the device is initially inserted into a wall aperture and adapted to spread said leg members further apart and against the inside surface of the wall when a screw driven through said front body portion from the head end thereof engages and pushes against the vertex of said web member.

4. A socket device for anchoring a screw to a wall comprising:
   a generally tubular front body portion having circumferentially continuous portions at both ends and axially extending slots along its sides;
   an annular radially extending flange at one end of said front body portion forming the head end of said device;
   a pair of normally divergent leg members extending from the other end of and flexible relative to said front body portion;
   a V-shaped flexible web member connected at its ends to the terminal ends of said divergent leg members with a flexible joint at its vertex located substantially in line with the axial centerline of said front body portion, said flexible web member being foldable between said divergent leg members when the device is initially inserted into a wall aperture and adapted to spread said leg members further apart and against the inside surface of the wall when a screw driven through said front body portion from the head end thereof engages and pushes against the vertex of the said web member.

5. The socket device as described in claim 4, including means forming a conical recess integral with said flexible web member and extending towards the head end of said device from said flexible joint for receiving and retaining the end of a screw advanced through said front body portion.

6. The socket device as described in claim 4, including at least one series of radially extending transverse serrations spaced apart longitudinally on the outside of said front body portion, said serrations terminating in an axially extending radially projecting face, said face preventing twisting of the socket device in a wall aperture having a diameter originally smaller than said serrations.

7. The socket device as described in claim 4, including a series of radially extending sharp edged serrations spaced apart along the outer surfaces of said divergent leg members.

8. The device as described in claim 7 wherein said latter serrations terminate along an axially extending radially extending face substantially parallel with the longitudinal axis of the leg member.

9. A socket device for anchoring a screw in a wall aperture formed as a unitary structure from a molded plastic material and comprising:
   a pair of angular shaped body members each having a first longitudinal segment and a second segment integrally attached and inclined thereto, said first segments being substantially parallel while said second segments are divergently positioned relative to each other;
   a fixed non-yieldable link member having an axial opening and connecting said first longitudinal segments together at one end, thereby forming the head end of the socket, and an annular flange extending radially outwardly from said longitudinal segments at said head end;
   a first V-shaped flexible link member connecting said body members at the junctions of said first and second segments and having a central opening aligned with the opening of said fixed member;
   a second V-shaped flexible link member located between and connecting the ends of said second integral segments, the apex of the V forming a flexible joint axially aligned with the opening of said fixed and said first flexible link members;
   and means forming a recess on said joint for retaining the end of a screw advanced axially between said first longitudinal segments;
   whereby said second flexible web means is progressively straightened as the screw is advanced into the socket, thereby causing the first and second segments of said body members to spread apart and secure the socket in the wall aperture.

10. The socket device as described in claim 9 wherein said first segments have a groove extending along their inner surfaces, said grooves forming a bore having a diameter less than the diameter of the screw used with said socket.

11. The socket device as described in claim 9 including a series of radially extending wedge shaped projections spaced apart axially along the outer surfaces of said first segments.

References Cited by the Examiner
UNITED STATES PATENTS

| | | | |
|---|---|---|---|
| 2,909,957 | 10/59 | Rapata | 85—5 |
| 2,948,937 | 8/60 | Rapata | 85—40 |
| 3,085,613 | 4/63 | Carpenter | 151—41.72 |

CARL W. TOMLIN, *Primary Examiner.*